H. G. WARR.
RAIL ANCHOR.
APPLICATION FILED MAY 8, 1919. RENEWED MAR. 2, 1921.

1,415,743.

Patented May 9, 1922.
7 SHEETS—SHEET 1.

H. G. WARR.
RAIL ANCHOR.
APPLICATION FILED MAY 8, 1919. RENEWED MAR. 2, 1921.

1,415,743.
Patented May 9, 1922.
7 SHEETS—SHEET 4.

Witnesses:
Inventor
Harold G. Warr
By Barnett Sirmay Attys.

H. G. WARR.
RAIL ANCHOR.
APPLICATION FILED MAY 8, 1919. RENEWED MAR. 2, 1921.

1,415,743.

Patented May 9, 1922.
7 SHEETS—SHEET 5.

Witnesses:

Inventor:
Harold G. Warr,
By Barnett Numan

H. G. WARR.
RAIL ANCHOR.
APPLICATION FILED MAY 8, 1919. RENEWED MAR. 2, 1921.

1,415,743.

Patented May 9, 1922.
7 SHEETS—SHEET 6.

UNITED STATES PATENT OFFICE.

HAROLD G. WARR, OF CHICAGO, ILLINOIS, ASSIGNOR TO THE P & M COMPANY, OF CHICAGO, ILLINOIS, A CORPORATION OF ILLINOIS.

RAIL ANCHOR.

1,415,743. Specification of Letters Patent. Patented May 9, 1922.

Application filed May 8, 1919, Serial No. 295,555. Renewed March 2, 1921. Serial No. 449,077.

*To all whom it may concern:*

Be it known that I, HAROLD G. WARR, a citizen of the United States, residing at Chicago, in the county of Cook and State of Illinois, have invented certain new and useful Improvements in Rail Anchors, of which the following is a specification.

My invention relates to devices for preventing the longitudinal creep of railway rails, these devices being commonly called rail anchors, anti-creepers or rail stays; and one of the principal objects of the invention is to provide a one-piece rail anchor of simple and compact construction which will engage the rail with spring action so as to maintain a reliable hold thereon, as against the tendency of the device to become loosened by vibration or other disturbing influences, and which may be very quickly and conveniently put in place on the rail, or removed therefrom, if occasion requires.

A further object of the invention is to provide a device which, while having the requisite strength, will be compact in form and light in weight so that it may be shipped conveniently and cheaply.

A further object of the invention is to provide an anti-creeping device which will take a firm grip on the rail when the rail tends to move forwardly, that is, in the direction of the tie against which the device bears, but on reverse movement of the rail, if such movement occurs, will permit the rail to move backwardly through the device if the latter is restrained from movement, for example, by resistance of the ballast.

A further object is to provide a one-piece rail anchor which can be used with rails having somewhat different rail base contours. It is well known that rails of different makes, even when of the same weight per linear unit, differ somewhat in the dimensions and contours of their bases. Moreover, rails of the same make may have slight differences due to the wearing of the rolls employed in manufacturing them.

The invention is illustrated, in preferred embodiments, in the accompanying drawings wherein—

Like characters of reference designate like parts in the several figures of the drawings.

Referring first to Figs. 1 to 5 inclusive of the drawings, 10 indicates a railroad rail and 11' one of the cross ties on which the rail is supported.

Figure 4:
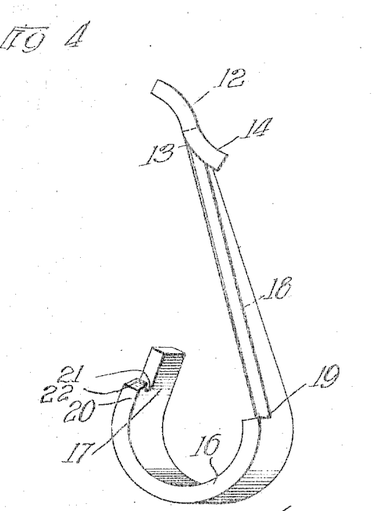
Fig. 4 is a plan view of the rail anchor before application to the rail, to illustrate particularly the twisting set which is given to the anchor in manufacture for the purpose to be hereinafter described.
Figure 5:
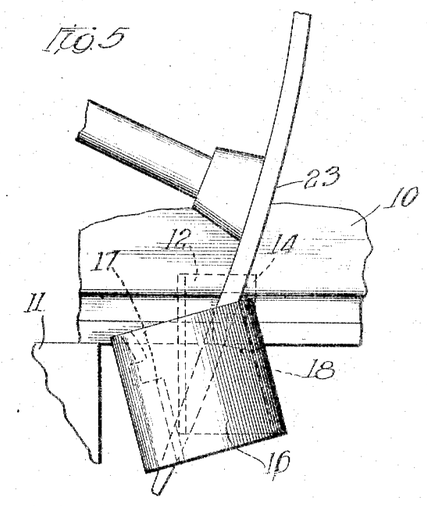
Fig. 5 is an end elevation of the device to illustrate the manner in which it is applied to the rail.

The rail anchor consists of a single piece of metal cut and bent to the form shown in these figures. I preferably use a flat piece of steel having some elasticity. The device is formed so as to provide a hook or jaw portion 12 at one end, the metal above the recess 13 forming the jaw being bent back to provide a lip 14 adapted to extend diagonally across and bear upon the upper surface of the base flange 15 of the rail. The other end of the device is formed with a return bent portion 16 which terminates in a jaw 17. The portion 18 of the anchor intervening between the jaw portions 12 and the return bent portion 16 is narrower than the ends of the anchor so that it will extend under the base flange of the rail. This provides a vertical edge or shoulder 19 at the place where the bent portion 16 commences, which is adapted to bear against the edge of the base flange of the rail. The device is preferably made so that the effective distance between the jaws 12 and 17, when the device is free of the rail, is less than the distance which the device has to span when being applied to or in operative position on the rail, in other words, in applying the anchor the jaws 12 and 17 have to be forced away from each other. The engagements of the anchor with the rail base preferably also are such that the body of the anchor is under torsional strain when applied to the rail. To accomplish this, the form of anchor shown in Figs. 1 to 5 inclusive is given a slight twisting set, as best shown in Figs. 4 and 5, this set being permanent so that the jaws 12 and 17 stand obliquely to each other before the anchor is applied to the rail. This obliquity is partially or wholly straightened out by such application. The lip 20 above the recess 21 formed in jaw member 17 has a beveled edge 22 to facilitate the application of the device to the rail.

The device is applied to the rail as follows: It is placed under the base flange of the rail with the jaw portion 12 engaging one edge of said base flange. This position is shown in Fig. 5 and is also indicated by the dotted lines in Fig. 1. The anchor is then given a twist in the direction opposite to its permanent set and the bent portion 16 is raised, that is, is straightened out with respect to the rest of the anchor until the lip 20 snaps over the edge of the base flange. This bending and lifting of the device may be conveniently accomplished by use of a pick 23 in the manner indicated in Fig. 5. The beveled edge 22 of the jaw member 17 will bear against and ride over the edge of the rail base as the anchor is forced to place on the rail. The application of the anchor to the rail thus creates the torsional strain in the body of the anchor above referred to. The anchor is also subjected to another strain when in operative position on the rail since in applying it the jaw 17 has to be forced in the direction away from the jaw 12, that is to say, the distance between jaws 12 and 17 has to be increased. This strain acts to produce and maintain, by spring action, a cramping or shackle hold of the anchor on the rail which is effective between the points engaged by the jaw 12 and the rail base abutment 19.

The device, as described above, will hold the rail against creeping forwardly, that is, in the direction from the anchor toward the tie against which the anchor bears and the hold which it takes upon the rail base is maintained, as against vibration or other disturbing influences, because the device is elastic and is under strain when in position on the rail. The anchor, however, will permit the rail to move in the opposite direction without carrying the anchor with it and this is desirable because the rearward movement of the anchor is likely to be interfered with by the ballast.

Figure 1:
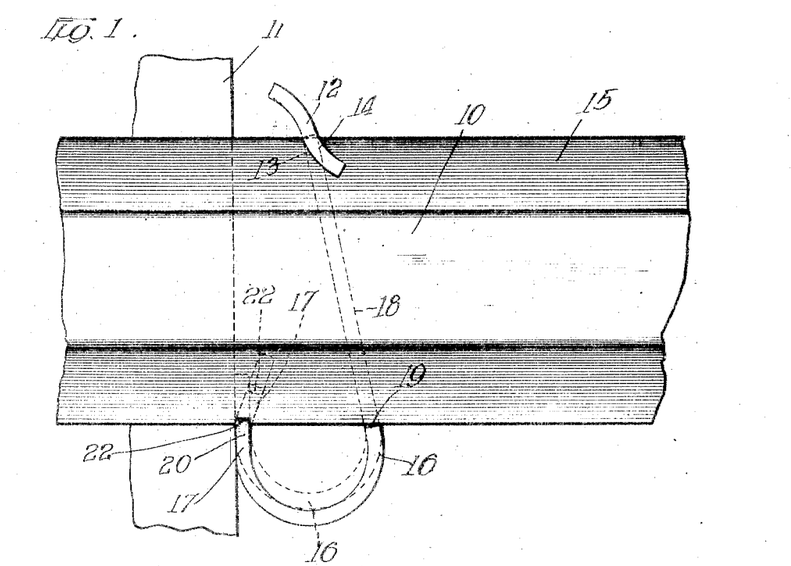
Fig. 1 is a plan view of the device shown as applied to the rail and in a position against one of the ties supporting the same.
Figure 2:
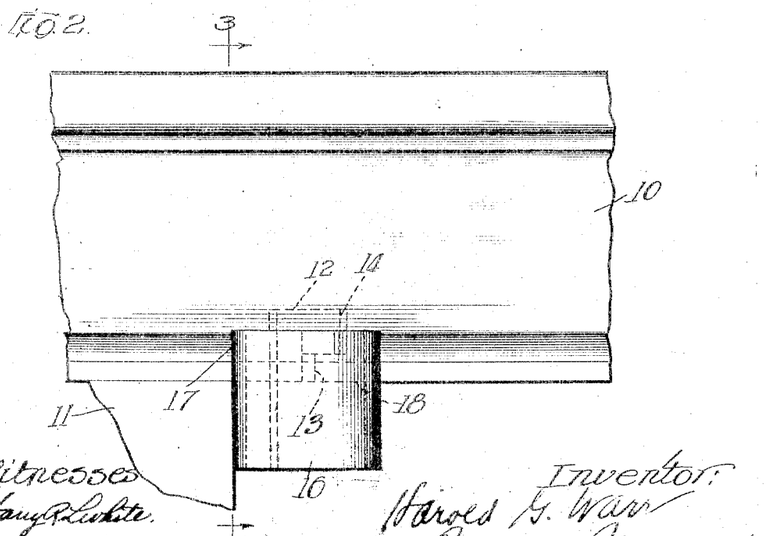
Fig. 2 is a side elevation of the rail anchor, rail and tie.
Figure 3:
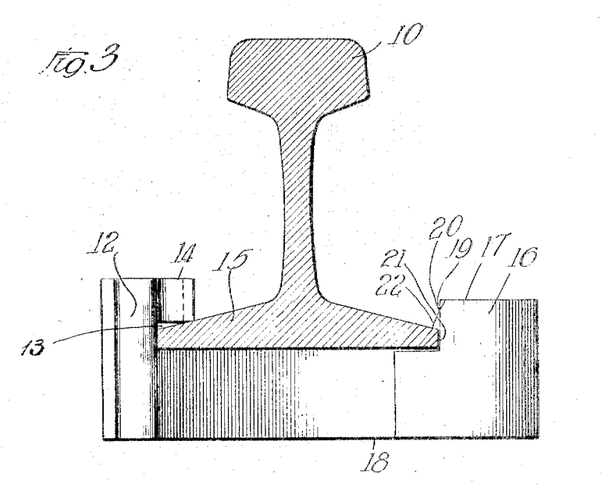
Fig. 3 is a sectional elevation on line 3—3 of Fig. 2, looking in the direction of the arrows.

One of the advantages of the device is that it can be used on rails, the bases of which have somewhat different contours. The fact that the anchor has to be strained when applied to the rail makes its use possible on rails having bases somewhat narrower or thinner than the maximum dimensions of base for which the device is designed. The expanding of the return bent portion of the anchor necessary for applying the device to the rail takes care of any slight differences in width of a given rail base. The torsional strain due to the straightening up of the anchor during application will accommodate it for rail bases of different thickness or having upper surfaces of different slope. It will ordinarily be necessary to apply the device to the rail a short distance back of the tie, as indicated in Fig. 5. When so applied it may be driven toward the tie by first striking one end and then the other until the jaw 17 is brought flatwise against the front face of the tie, as shown in Fig. 1.

Figure 6:
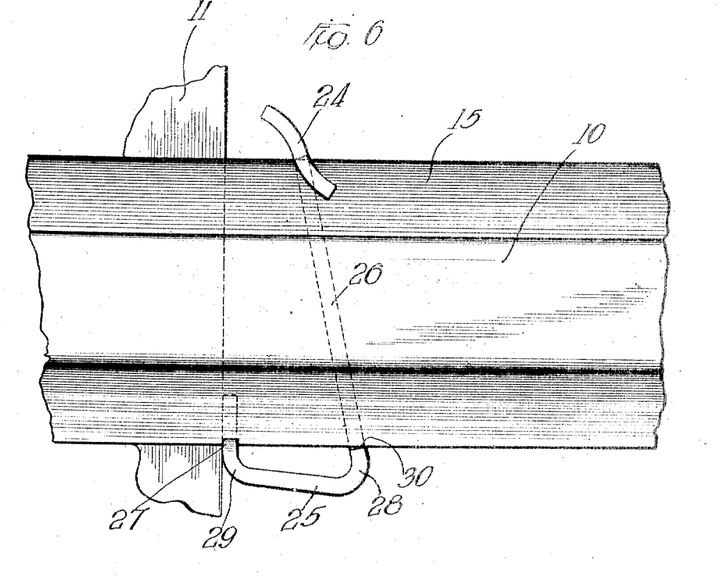
Fig. 6 is a view, similar to Fig. 1, illustrating a modification.
Figure 7:
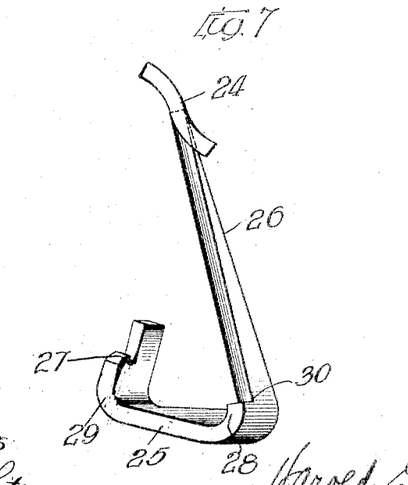
Fig. 7 is a plan view of the rail anchor shown in Fig. 6 to illustrate the shape of the anchor before it is strained by application to the rail.
Figure 8:
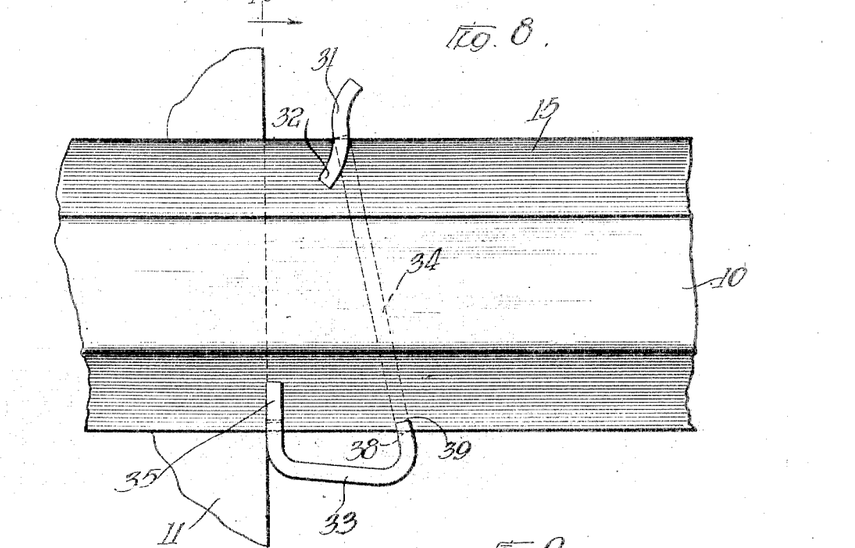
Fig. 8 is a plan view, and Fig. 9 an end elevation of another modified form of the invention, the device being shown as applied to a rail.
Figure 9:
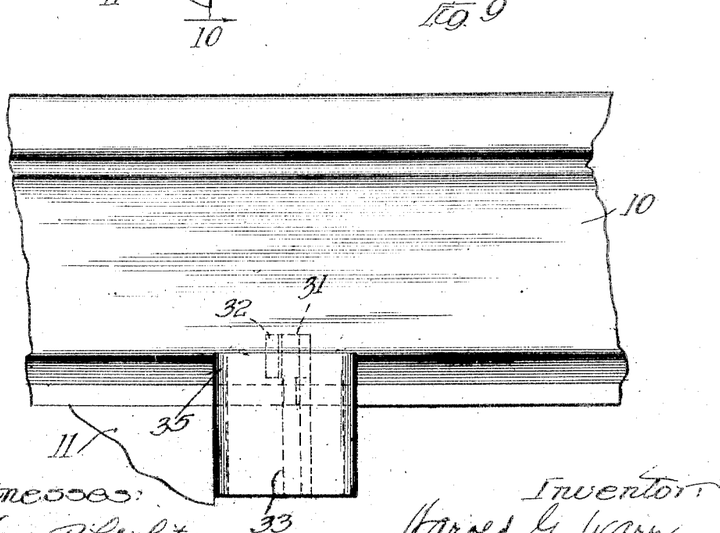
Figure 10:
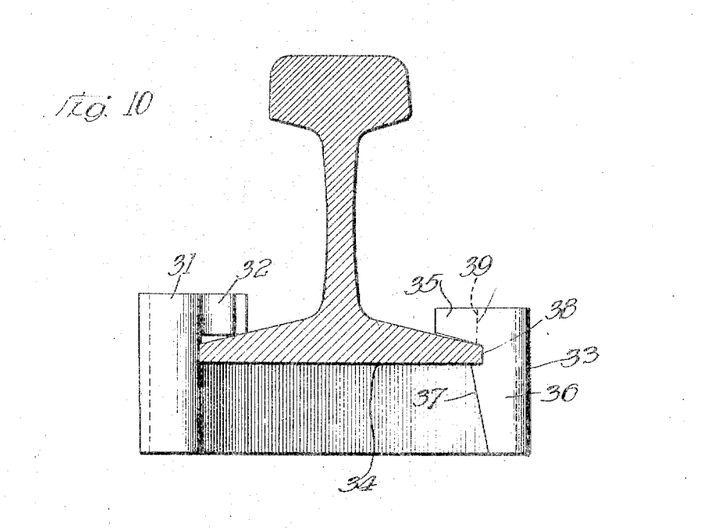
Fig. 10 is a sectional elevation on line 10—10 of Fig. 8, looking in the direction of the arrows.

The modified construction shown in Figs. 6 and 7 differs only from that shown in the preceding figures in respect to the portion of the anchor which has been termed the return bent portion. The anchor shown in Figs. 6 and 7 comprises a jaw portion 24, a return bent portion 25 and a connecting web 26. The return bent portion 25 instead of being curved as shown in Figs. 1 to 5 inclusive, is straight for the main part, the straight portion being connected to the web 26 and to the jaw member 27 by sharp angular bends 28, 29. This embodiment of the invention has the advantage that there is no possibility of the return bent portion being flexed. When the jaw 27 is forced away from the jaw 24 the return bent portion transmits the entire thrust produced by this expansion of the anchor against the rail base at the point at which abutment 30 bears thereon.

In the arrangement shown in the first five figures, unless the bowed or return bent portion is made very stiff some of the bending strain resulting from the application of the device to the rail may occur in the return bent portion itself, which is obviously undesirable.

Figure 11:
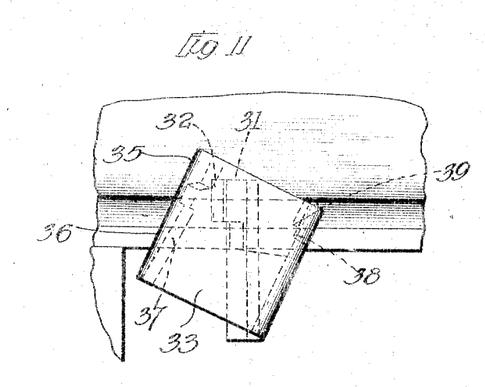
Fig. 11 is an end elevation illustrating the method of application of this form of device to the rail.
Figure 12:
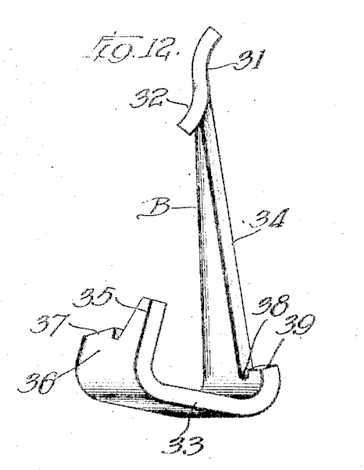
Fig. 12 is a plan view of the device before application to the rail.
Figure 13:
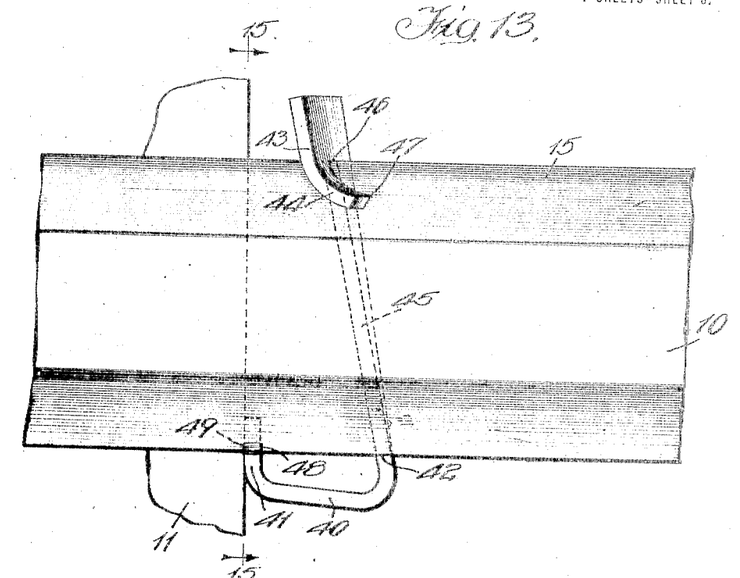
Fig. 13 is a plan view of another modified form of the invention in which the device is not given a permanent twisting set, the torsional strain produced by the application of the anchor resulting instead from the contour given to one of the rail base engaging jaws.
Figure 14:
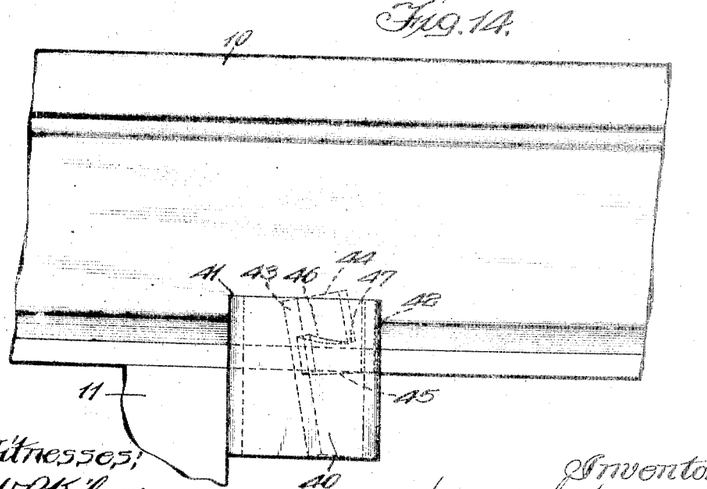
Fig. 14 is an end elevation of this form of device.
Figure 15:
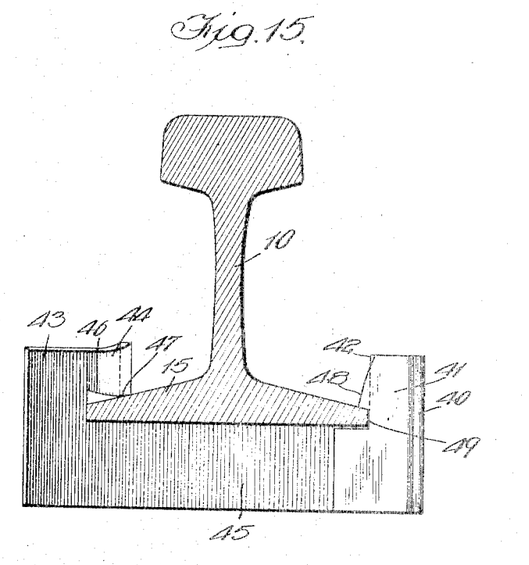
Fig. 15 is a sectional elevation on line 15—15 of Fig. 13.
Figure 16:
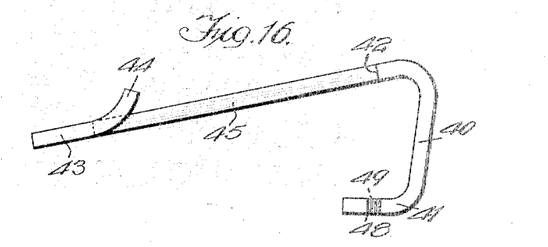
Figs. 16 and 17 are plan and side views, respectively, of the device when free from the rail.
Figure 17:
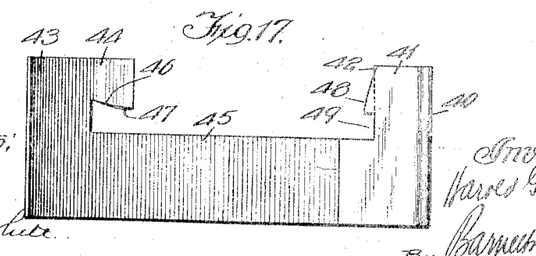

In Figs. 8 to 12 inclusive, I have shown an anchor involving the same principles of construction as the anchors previously described but embodied in a somewhat different form of construction. The anchor consists of a jaw portion 31, the upper lip 32 of which extends forwardly instead of rearwardly as in the constructions previously described, of a return bent portion 33 and a connecting web 34. The permanent twisting set given to the anchor is the reverse of the set given to the anchors previously described. This means that in applying the device the jaw portion 35 must be forced downwardly instead of upwardly as is indicated in Fig. 11. As a result the beveled surface which rides over the rail base during application of the anchor is formed on the lower portion 36 of the jaw 35. This beveled surface is indicated at 37. It is also necessary to provide the abutment 38 with a lip 39 to overhang the rail base to provide a fulcrum on which to rock or turn the end of the anchor during its application to the rail.

In the modified form of the invention shown in Figs. 13 to 17 inclusive, the torsional strain to which the anchor is subjected when in position on the rail is obtained, without giving the body of the anchor a permanent twisting stress, through the peculiar contour and position of one of the rail engaging jaws.

The anchor comprises a return bent portion 40 having a rail engaging jaw 41 and a rail abutment 42, a jaw 43 at the other end of the anchor provided with a backwardly turned lip 44 and a connecting web 45 which does not have the twisting set characteristic of the forms of the invention previously described. The lower edge 46 of lip 43 is inclined downwardly toward the rail base so that the space between its inner corner 47 and the opposite point on the web 45 is less than the thickness of the rail base at the point engaged by the lip when the device is in its operative position. This necessitates tilting the anchor when applying it to the rail which throws the jaw 41 out of line with the rail base, that is to say, below the same. In order to bring jaw 41 into operative engagement with the rail base it is necessary to twist or strain the anchor. In this operation the beveled face 48 rides over the edge of the rail base until the latter snaps into the recess 49 in jaw 41.

The embodiments illustrated in Figs. 8 to 17 inclusive, are not claimed specifically herein, the specific features of these embodiments being made the subject-matter of my copending applications Serial Nos. 495,386 and 495,387 filed August 25th, 1921, which applications are divisions hereof.

I claim:

1. A rail anchor comprising a spring metal member provided at one end with means comprising a single jaw for engaging one side of a rail and at the other with a return bent portion, the free end and an intermediate portion of which are provided with means for engaging the other side of the rail at two points, the means on said free end and said jaw being positioned so that they are forced apart when the anchor is applied to and in operative position on the rail to create a strain which gives the device a resilient hold on the rail, said return bent portion remaining substantially rigid while the anchor is applied to the rail.

2. A rail anchor comprising a spring metal member provided at one end with means for engaging one side of a rail and at the other with a return bent portion terminating in means for engaging the other side of the rail, said rail engaging means being positioned so that they are forced apart and so that said member is given a torsional strain when the anchor is applied to the rail, said return bent portion remaining substantially rigid while the anchor is applied to the rail.

3. A rail anchor comprising a spring metal member provided at one end with means comprising a single jaw for engaging one side of a rail and at the other end with a return bent portion formed with a rail base abutment and terminating in means for engaging the rail base, the rail base engaging means at opposite ends of the anchor being positioned so that they are forced apart when the anchor is applied to and in operative position on the rail to create a strain which gives the device a resilient hold on the rail, said return bent portion remaining substantially rigid while the anchor is applied to the rail.

4. A rail anchor comprising a spring metal member provided at one end with means for engaging one side of a rail and at the other end with a return bent portion formed with a rail base abutment and terminating in means for engaging the rail base, said rail engaging means at opposite ends of the anchor being positioned so that they are forced apart and so that said member is given a torsional strain when the anchor is applied to the rail, said return bent portion remaining substantially rigid while the anchor is applied to the rail.

5. A rail anchor comprising a spring metal member provided at one end with a single jaw having a lip bent obliquely to the body portion of said member to engage the upper surface of the rail base and at the other end with a return bent portion terminating in a jaw to engage the other side of the rail base, said jaws being positioned so that they are forced apart when the anchor is applied to and in operative position on the rail to create a strain which gives the device a resilient hold on the rail.

6. A rail anchor comprising a spring metal member provided at one end with a jaw having a lip bent obliquely to the body portion of said member to engage the upper surface of the rail base and at the other end with a return bent portion terminating in a jaw to engage the other edge of the rail base, said rail engaging jaws being positioned so that they are forced apart and so that said member is given a torsional strain when the anchor is applied to the rail.

7. A rail anchor comprising a spring metal member provided at one end with a jaw having a lip bent obliquely to the body portion of said member to engage the upper surface of the rail base and at the other end with a return bent portion formed with a rail base abutment and terminating in a jaw to engage the other edge of the rail base, said rail engaging jaws being positioned so that they are forced apart and so that the said member is given a torsional strain when the anchor is applied to the rail.

8. A rail anchor comprising a spring metal member provided at one end with means for engaging one side of a rail and at the other with a return bent portion terminating in means for engaging the other side of the rail, said rail engaging means being positioned so that they are forced apart when the anchor is applied to and in operative position on the rail to create a strain which gives the device a resilient hold on the rail, said return bent portion being in a horizontal plane and formed adjacent its rail engaging means with a beveled surface adapted to ride over the rail base when the anchor is applied to the rail.

9. A rail anchor comprising a spring metal member provided at one end with means for engaging one side of a rail and at the other with a return bent portion terminating in means for engaging the other side of the rail, said rail engaging means being positioned so that they are forced apart and so that said member is given a torsional strain when the anchor is applied to the rail, said return bent portion being formed adjacent its rail engaging means with a beveled surface adapted to ride over the rail base when the anchor is applied to the rail.

10. A rail anchor comprising a spring metal member provided at one end with a jaw having a lip bent obliquely to the body portion of said member to engage the upper surface of the rail base and at the other end with a return bent portion formed with a rail base abutment and terminating in a jaw to engage the other edge of the rail base, said jaw being formed with a beveled surface adapted to ride over the edge of the rail base when the anchor is applied to the rail, the jaws being positioned so that they have to be forced apart and so that they give the said member a torsional strain when the device is applied to the rail.

11. A rail anchor comprising a spring metal member adapted to extend diagonally under the rail base and provided at one end with a single jaw for engaging one side of the rail base and at the other with a return bent portion terminating in a jaw to engage the other side of the rail base, the distance between said jaws when the anchor is free from the rail, being less than the distance between them when the anchor is in operative position on the rail, said return bent portion remaining substantially rigid while the anchor is applied to the rail.

12. A rail anchor comprising a spring metal member provided at one end with means to engage one side of the rail base and at the other with a return bent portion terminating in means to engage the other side of the rail base, the distance between said rail base engaging means when the anchor is free from the rail, being less than the distance between them when it is in operative position on the rail, said engaging means being positioned to give a torsional strain to said member when the anchor is in place on the rail, said return bent portion remaining substantially rigid while the anchor is applied to the rail.

13. A rail anchor comprising a spring metal member provided at one end with a single jaw for engaging one side of the rail base and at the other with a return bent portion terminating in a jaw to engage the other side of the rail base, the distance between said jaws when the anchor is free from the rail being less than the distance between them when the device is in operative position on the rail, the jaw on said return bent portion being formed with a beveled surface adapted to ride over the rail base during application of the anchor to the rail.

14. A rail anchor comprising a spring metal member provided at one end with a rail base abutment and in addition thereto at one end with a single jaw for engaging one side of the rail base and at the other with a return bent portion terminating in a jaw to engage the other side of the rail base, the distance between said jaws, when the anchor is free from the rail, being less than the distance between them when the device is in operative position on the rail, the jaw at one end of said member being formed with a beveled surface adapted to ride over the rail base during application of the anchor to the rail.

15. A resilient one-piece rail anchor comprising a bar adapted to extend diagonally under the base of a rail and to take a shackle hold thereon, said bar being provided at one end with a single jaw, and at the other end, with an extension which terminates in a jaw, said jaws engaging the edges of the rail base so as to strain the anchor and maintain the shackle hold of the device on the rail, the jaws being positioned so that the anchor is under a torsional strain when applied to the rail, said extension remaining substantially rigid while the anchor is applied to the rail.

16. A resilient one-piece rail anchor comprising a bar adapted to extend diagonally under the base of a rail and to take a shackle hold thereon, said bar being provided with an extension which engages the edge of the rail base so as to strain the anchor and maintain the shackle hold of the device on the rail, the opposite ends of the bar being formed with lips which overlap the rail base, one of which is bent so as to stand oblique to the bar and the bar being adapted to engage the rail base so that it is given a torsional strain when the anchor is applied to the rail.

17. A one-piece rail anchor consisting of a spring metal member provided at each end with a single rail base engaging jaw, one of said jaws adapted to bear against a tie, and with a rail base abutment at this end spaced from said last mentioned jaw, the jaws being positioned with respect to each other so that the anchor is under a torsional strain when in operative position on the rail, the portion of the anchor between said abutment and the jaw at that end being substantially rigid while the anchor is applied to the rail.

18. A one-piece rail anchor consisting of a spring metal member formed at each end with a single rail base engaging jaw and with a rail base abutment at one end spaced from the jaw at that end, said jaws being positioned so that they have to be spread one from the other when the anchor is applied to and in operative position on the rail, the portion of the anchor between said abutment and the jaw at that end being substantially rigid while the anchor is applied to the rail.

19. A one-piece rail anchor consisting of a spring metal member formed with rail base engaging jaws at opposite ends, one of said jaws adapted to bear against a tie, and with a rail base abutment at this end spaced from the last mentioned jaw, said jaws being positioned so that they have to be spread one from the other when the anchor is applied to the rail, and so that the anchor is subjected to a twisting strain when so applied, the portion of the anchor between said abutment and the jaw at that end being substantially rigid while the anchor is applied to the rail.

20. A one-piece rail anchor consisting of a spring metal member formed at each end with a single rail base engaging jaw and with a rail base abutment at one end spaced from the jaw at that end, said jaws being positioned so that they have to be spread one from the other when the anchor is applied to and in operative position on the rail, the portion of the anchor between said abutment and the jaw at that end being substantially rigid while the anchor is applied to the rail, said anchor being adapted to hold the rail against movement in the direction from the anchor toward the car, but permitting the rail to move in the other direction therethrough when the anchor itself is held from movement by the ballast, or the like.

21. A one-piece rail anchor consisting of a spring metal member provided at each end with a single rail base engaging jaw, one of said jaws adapted to bear against a tie, and with a rail base abutment at this end spaced from said last mentioned jaw, the jaws being positioned with respect to each other so that the anchor is under a torsional strain when in operative position on the rail, the portion of the anchor between said abutment and the jaw at that end being substantially rigid while the anchor is applied to the rail, said anchor being adapted to hold the rail against movement in the direction from the anchor toward the tie, but permitting the rail to move in the other direction therethrough when the anchor itself is held from movement by the ballast, or the like.

22. A one-piece rail anchor made from a flat piece of steel, one end of which is recessed to form a rail engaging jaw, the other end of which is provided with a rail base abutment and with a return bent portion terminating in a rail engaging jaw adapted to bear against the tie, the said jaws being positioned so that they are forced apart when the anchor is in operative position on the rail, said return bent portion being substantially rigid while the anchor is applied to the rail.

23. A one-piece rail anchor made from a flat piece of steel, one end of which is recessed to form a jaw and the other end in the form of a return bend terminating in a rail engaging jaw adapted to bear against the tie, the intervening portion being given a slight oblique set so that the anchor is under torsional strain when it is on the rail base.

24. A one-piece rail anchor made from a flat piece of steel, one end of which is recessed to form a jaw with the metal above the recess bent to provide a lip to bear obliquely upon the upper surface of the rail base, and the other end in the form of a return bent portion terminating in a rail engaging jaw adapted to bear against a tie, the intervening portion being given a slightly oblique set so that said jaws before application of the device to the rail stand obliquely to each other.

25. A one-piece rail anchor made from a flat piece of steel, one end of which is recessed to form a jaw and the other end formed with a vertical shoulder to bear against the rail base, and the metal beyond said shoulder being in the form of a return bend terminating in a rail engaging jaw adapted to bear against a tie, the intervening portion being given a slightly oblique set so that said jaws before application of the device to the rail stand obliquely to each other.

26. A one-piece rail anchor made from a flat piece of steel, one end of which is recessed to form a jaw and the other end formed with a vertical shoulder to bear against the rail base, and the metal beyond said shoulder being in the form of a return bent portion terminating in a rail engaging jaw adapted to bear against a tie, the intervening portion being given a slightly oblique set so that said jaws before application of the device to the rail stand obliquely to each other, the edge of the anchor adjacent the last mentioned jaw being beveled to provide a cam surface adapted to ride over the edge of the rail base when the anchor is applied to the rail.

27. A one-piece rail anchor made from a flat piece of steel, one end of which is recessed to form a jaw with the metal above the recess bent to provide a lip to bear obliquely upon the upper surface of the rail base, and the other end formed with a shoulder to bear against the edge of the rail base and bent to form a bowed portion recessed to provide a jaw, the inner edge of the metal above said recess being beveled for the purpose described, the portion of the device between said jaws being given a slight twisted set so that the jaws stand obliquely to each other.

28. A rail anchor comprising a spring metal member provided at one end with means comprising a single jaw for engaging one side of a rail and at the other with a return bent portion terminating in means for engaging the other side of the rail and for bearing against a tie, said rail engaging means being positioned so that they are forced apart when the anchor is applied to and in operative position on the rail to create a strain which gives the device a resilient hold on the rail, said return bent portion being substantially rigid while the anchor is applied to the rail.

29. A rail anchor comprising a spring metal member provided at one end with means for engaging one side of the rail and at the other with a return bent portion terminating in means for engaging the other side of the rail and for bearing against a tie, said rail engaging means being positioned so that they are forced apart when the anchor is applied to and in operative position on the rail to create a strain which gives the device a resilient hold on the rail, said return bent portion being formed adjacent its rail and tie engaging means with a beveled surface adapted to ride over the rail base when the anchor is applied to the rail.

30. A rail anchor comprising a spring metal member provided at one end with means for engaging one side of the rail and at the other with a return bent portion terminating in means for engaging the other side of the rail and for bearing against a tie, said rail engaging means being positioned so that they are forced apart and so that said member is given a torsional strain when the anchor is applied to the rail, said return bent portion being formed adjacent its rail and tie engaging means with a beveled surface adapted to ride over the rail base when the anchor is applied to the rail.

31. A rail anchor comprising a spring metal member provided at one end with means comprising a single jaw for engaging one side of a rail and at the other end with a return bent portion formed with a rail base abutment and terminating in means for engaging the rail base, the rail base engaging means at opposite ends of the anchor being positioned so that they are forced apart when the anchor is applied to and in operative position on the rail to create a strain which gives the device a resilient hold on the rail, said return bent portion being substantially rigid while the anchor is applied to the rail.

32. A rail anchor comprising a spring metal member provided at one end with means comprising a single jaw for engaging one side of a rail and at the other with a return bent portion terminating in means for engaging the other side of the rail and for bearing against a tie, said rail engaging means being positioned so that they are forced apart when the anchor is applied to and in operative position on the rail to create a strain which gives the device a resilient hold on the rail, said return bent portion being substantially rigid while the anchor is applied to the rail.

33. A one-piece rail anchor recessed at one end and formed with an obliquely turned lip to engage the base of the rail at one side thereof, a return bent portion at the other end formed with a rail base abutment and terminating in a recessed portion adapted to engage the other edge of the rail base and to bear against a tie, and an intervening web having a permanent twisting set, the distance between said recesses, when the anchor is free from the rail, being less than the distance between the same when the device is applied to the rail, and the return bent portion being formed, adjacent its recess, with a beveled surface for the purpose described.

34. A rail anchor comprising a spring metal member provided at one end with means comprising a single jaw for engaging one side of a rail, and at the other with a return bent portion, the major part of which is substantially straight, terminating in means for engaging the other side of the rail, said rail-engaging means being positioned so that they are forced apart when the anchor is applied to the rail to create a strain which gives the device a resilient hold on the rail.

35. A rail anchor comprising a spring metal member provided at one end with means for engaging one side of the rail and at the other with a return bent portion, the major part of which is substantially straight, terminating in means for engaging the other side of the rail, said rail engaging means being positioned so that they are forced apart, and so that said member is given a torsional strain when the anchor is applied to the rail.

36. A rail anchor comprising a spring metal member provided at one end with means comprising a single jaw for engaging one side of a rail and at the other end with a return bent portion, the major part of which is substantially straight, formed with a rail base abutment and terminating in means for engaging the rail base, the rail base engaging means at opposite ends of the anchor being positioned so that they are forced apart when the anchor is applied to the rail to create a strain which gives the device a resilient hold on the rail.

37. A one-piece rail anchor recessed at one end and formed with a backwardly turned lip to engage the base of a rail at one side thereof, a return bent portion at the other end formed with a rail base abutment and terminating in a recessed portion adapted to engage the other edge of the rail base, and to bear against a tie, an intervening web having a permanent twisting set, the distance between said recesses when the anchor is free of the rail, being less than the distance between the same when the device is applied to the rail, and the return bent portion being formed above its recess with a beveled surface, for the purpose described.

38. A one-piece rail anchor recessed at one end and formed with a backwardly turned lip to engage the face of the rail at one side thereof, a return bent portion at the other end, the major portion of which is substantially straight and diverges from the edge of the rail base in a direction away from the tie, said return bent portion formed with a rail base abutment and terminating in a recessed part adapted to engage the rail base and bear against the tie, and a connecting web which has a permanent twisting set, said return bent portion being formed above the recess therein with a beveled surface, for the purpose described.

HAROLD G. WARR.